United States Patent [19]

Berlin et al.

[11] 3,789,673

[45] Feb. 5, 1974

[54] PICKUP OF THE ANGULAR SPEED OF A ROTATING OBJECT

[76] Inventors: German Semenovich Berlin, 5 Parkovaya ulitsa, 42, kv. 95; Dmitry Dmitrievich Shenker, Profsojuznaya ulitsa, 31, kv. 223; Valery Germanovich Serebrenny, ulitsa akademika Koroleva, 3a, kv. 49, all of Moscow, U.S.S.R.

[22] Filed: Oct. 27, 1971

[21] Appl. No.: 192,913

[52] U.S. Cl. .................................................. 73/505
[51] Int. Cl. ............................................. G01c 19/56
[58] Field of Search ...... 73/505; 313/146, 147, 152; 315/357

[56] References Cited
UNITED STATES PATENTS

| | | | |
|---|---|---|---|
| 2,683,596 | 7/1954 | Morrow et al. | 73/505 |
| 2,839,701 | 6/1958 | Bourns | 313/146 |
| 2,895,048 | 7/1959 | Jacobsen | 313/146 X |
| 3,047,766 | 7/1962 | Glass | 313/146 X |
| 2,753,173 | 7/1956 | Barnaby et al. | 73/505 |
| 3,253,471 | 5/1966 | Maillard | 73/505 |

Primary Examiner—James J. Gill
Attorney, Agent, or Firm—Eric H. Waters et al.

[57] ABSTRACT

The essence of the invention is that the pickup of the angular speed of a rotating object includes a housing receiving therein a fork of the tuning fork kind. The pickup also comprises a device for exciting oscillation of the prongs of this fork and a device for measuring the torsional oscillation of this fork, developed upon said pickup being rotated together with the associated object about the axis of symmetry thereof, the last-mentioned device being disposed adjacent to the stem of the fork. At least one of these two devices is in the form of an electronic-mechanical transducer with a mechanically controlled electrode. For example, when it is the device for exciting oscillation of the prongs of the fork that is made in the form of the electronic-mechanical transducer, then the mechanically controlled electrode thereof can be formed by the prongs of the fork, acting as the anode of this transducer. Directly adjacent to the prongs of the fork there is mounted a winding about a core, adapted to excite oscillation of the fork, the cathode of this device being positioned intermediate of the prongs of the fork.

7 Claims, 8 Drawing Figures

Patented Feb. 5, 1974

PICKUP OF THE ANGULAR SPEED OF A ROTATING OBJECT

The invention relates to electric pickups of non-electric variable, and, more particularly, it relates to pickups of the angular speed of rotating objects.

There are known pickups of the angular speed of rotating objects, having a housing receiving thereinside a fork of the tuning fork kind, a device for exciting oscillation of the prongs of this fork and a device for measuring the torsional oscillation of this fork, developed upon rotation of the pickup with the associated object about the axis of symmetry of the fork, the last-mentioned device being disposed adjacent to the stem of the fork.

The device for exciting oscillation of the fork in these known pickups comprises either two or more electromagnetic transducers and a feedback amplifier. The device for measuring the torsional oscillation comprises either one or two electromagnetic transducers.

However, the abovespecified known pickups offer poor sensitivity and insufficient accuracy of the responce. The necessity of having an amplifier makes the pickup both complicated and bulky.

It is an object of the present invention to create a pickup for measuring the angular speed of a rotating object that should feature considerably increased sensitivity and accuracy of the response of the pickup and should be of a simplified structure.

This object is attained in a pickup for measuring the angular speed of a rotating object, comprising a housing receiving therein a fork, a device for exciting oscillation of the prongs of said fork and a device for measuring the torsional oscillation of said fork, developed upon said pickup being rotated together with said object about the axis of symmetry of said fork, said last-mentioned device being positioned adjacent to the stem of said fork, in which pickup, in accordance with the present invention, at least one of said two devices is in the form of an electronic-mechanical transducer including a mechanically controlled electrode.

In case it is the said device for exciting oscillation of the prongs of the fork that is in the form of said electronic-mechanical transducer, it is advisable that said mechanically controlled electrode should be formed by said prongs of said fork, said electrode being the anode of said transducer, there being disposed adjacent to said prong at least one winding about a core, adapted to excite the oscillation of said prongs of said electrode, the cathode of the said transducer being disposed intermediate of said prongs of said fork.

When it is the device for measuring the torsional oscillation of said fork that is in the form of an electronic-mechanical transducer, then it is advisable that the mechanically controlled electrode of this transducer to be in the form of at least one plate rigidly mounted on one of said prongs of said fork, said plate being the anode of said transducer and being displaceable in respect of the cathode of the said transducer upon development of the torsional oscillation of said fork, thereby bringing about periodic variation of the anode current at the natural frequency of oscillation of said fork and with the amplitude of the variable component of this current proportional to the angular speed of said rotating object, the working surface of said cathode extending parallel with the plane of said anode.

Alternatively, when it is the device for exciting oscillation of said prongs of said fork that is made in the form of said electronic-mechanical, it is advisable for said mechanically controlled electrode thereof to be a grid mechanically connected with said prongs of said fork, there being disposed to the opposite sides of said grid and parallel to the plane thereof the flat cathode and the flat anode, respectively, of the said transducer, there being further positioned adjacent to said prongs of said fork at least one winding about a core, adapted to excite oscillation of said prongs of said fork.

Alternatingly, when it is said device for measuring the torsional oscillation of said fork that is made in the form of an electronic-mechanical transducer, it is advisable that said mechanically controlled electrode thereof should be a grid, mechanically connected with the stem of the fork and displaceable in respect of the cathode and the anode of the said transducer upon development of the torsional oscillation of said fork, thereby varying periodically the anode current at the natural frequency of oscillation of said fork with the amplitude of the variable component of said current proportional to the angular speed of said rotating object, the working surfaces, respectively, of said cathode and of said anode extending parallel to the plane of said grid.

The herein disclosed pickup of an angular speed, adapted to transform a speed of rotation into a variable electric signal of which the amplitude is proportional to the angular speed features high sensitivity to the variable being measured, whereby the range of its applications can be broadened. The pickup also offers increased accuracy of its response due, among other things, to the fact that the connection between the fork and the device for exciting oscillation of the prongs thereof is weak; moreover, the pickup offers relatively great amplitude of the output signal, in combination with simple structure, together with simplicity of the economical circuit of power supply of the electrodes.

The present invention will be further described in connection with an embodiment thereof, with reference being had to the accompanying drawings, wherein.

Figure 1:
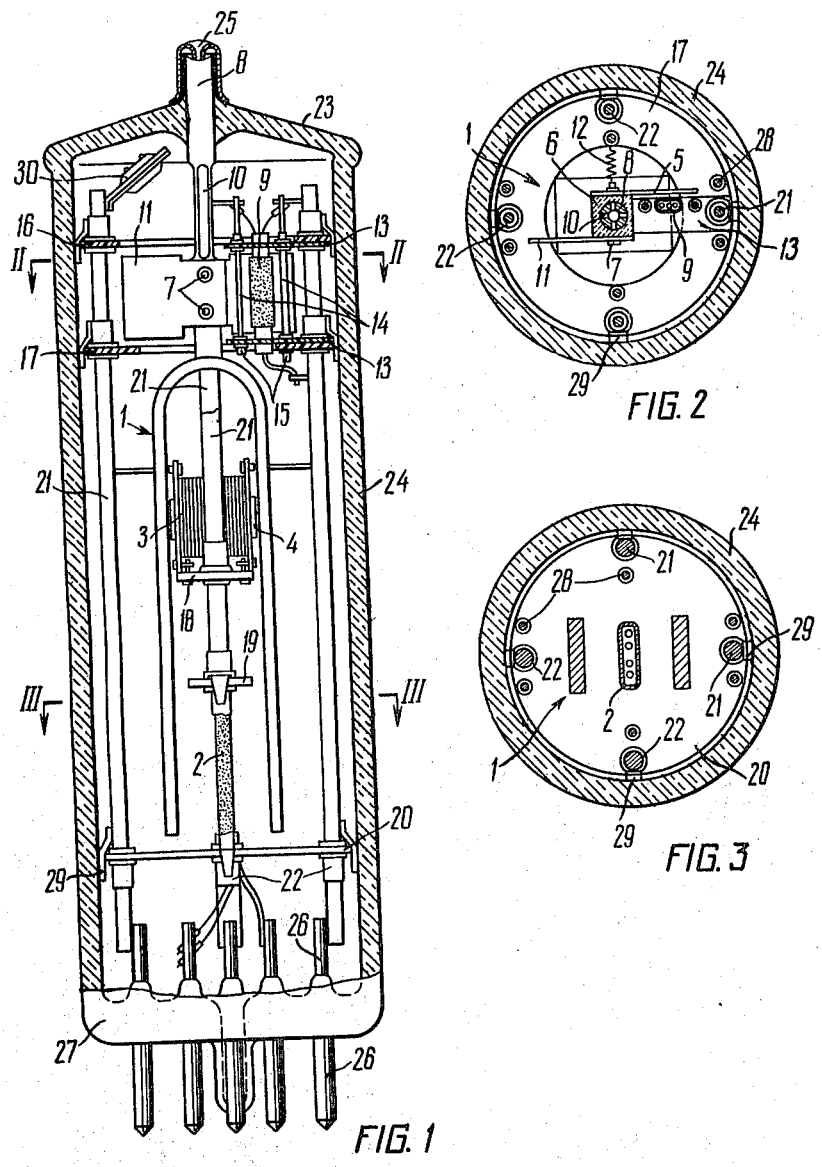
FIG. 1 is a general partly broken away view of a pickup of the angular speed of a rotating object, constructed in accordance with the invention.

The pickup of the angular speed of a rotating object, embodying the invention, comprises an electronic tube including a fork 1 (FIG. 1) made from a ferromagnetic material, a device for exciting the prongs of the fork 1 and a device for measuring the torsional oscillation of the fork 1 in the form of a pair of diode-type electronic-mechanical transducers with mechanically controlled electrodes.

The mechanically controlled electrode of the electronic-mechanical transducer acting as the device for exciting the oscillations is formed by the prongs of the fork 1, these forks also serving as the anode of this transducer. Positioned intermediate of the prongs of the fork and symmetrically in relation thereto are an indirectly heated cathode 2 and a winding 3 about a core 4.

Figure 2:
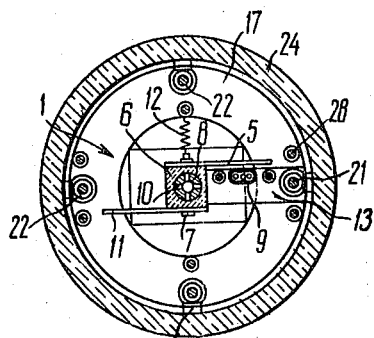
FIG. 2 is a sectional view taken along line II—II of FIG. 1.

The electronic-mechanical transducer acting as the device for measuring the torsional oscillation of the fork 1 is a diode with flat-parallel electrodes. The anode 5 (FIG. 2) of the last-mentioned diode is the mechanically controlled electrode of the herein described transducer and is rigidly mounted by means of a ceramic insulating member 6 and tubular fasteners 7 (FIG. 1) with the stem 8 of the fork 1, whereby the anode 5 is able to move relative to its indirectly heated oxide cathode 9 when the fork 1 develops torsional oscillation.

In order to step up the response of the herein disclosed pickup by bringing down the torsional rigidity of the stem 8 of the fork 1, the stem 8 is made in the form of a hollow tube having openings 10 made therethrough, the openings extending axially of the stem 8 above the portion thereof where the anode 5 is mounted.

Balancing of the fork 1 is attained by providing a plate 11 secured to the prong 8 of the fork 1 by means of an insulating member 6 and fasteners 7, the plate 11 being similar to the anode 5 and being arranged symmetrically therewith and in opposition thereto, at the opposite side of the longitudinal axis of the prong 8. A weak spring 12 (FIG. 2) serves as the electric lead of the anode 5.

The indirectly heated cathode 9 (FIG. 1) is mounted by means of mica plates 13, crosspieces 14 and fasteners 15 as an independent assembly that is positioned into the tube and secured thereto only at the final assembling stage.

If it is desirable to increase the response of the device measuring the oscillation of the fork 1 still further, the abovementioned plate 11 can be used as the second anode, another cathode similar to the indirectly heated cathode 9 being positioned in this case in opposition to the anode-plate 11. This embodiment of the invention will be described in more detail hereinbelow.

Jointing of the abovedescribed major parts of the herein disclosed pickup into a unitary package is effected with the help of mica plates 16 ... 20, support crosspieces 21 and tubular fasteners 22. Should it be necessary to render the package more rigid, the number of the support crosspieces may be increased, and the mica plates 16... 20 may be replaced by more rigid and strong ceramic insulators.

The fork 1 is mounted by its stem 8 being welded into the glass dome 23 which latter, in its turn, is welded in the course of assembling of the herein described tube with the housing of the pickup, which is in the form of an evacuated glass envelope 24. The electric lead of the anode of the device exciting oscillation of the prongs of the fork 1 is formed by a cup member 25 soldered to the portion of the stem 8 of the fork 1, projecting beyond the dome 23.

Figure 3:
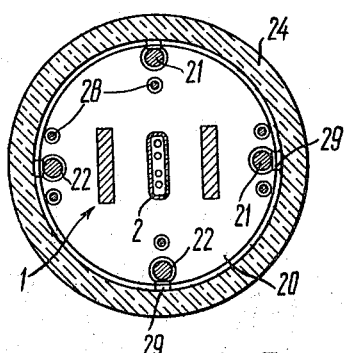
FIG. 3 is a sectional view taken along line III—III of FIG. 1.

The indirectly heated oxide cathode 2 is connected directly to the terminals 26 of the base 27 of the electronic tube. The rest of the electrodes of the tube and the winding 3 are connected to the respective terminals 26 of the base 27 by means of the respective crosspieces 21 and 28 (FIG. 3).

Positive positioning of the assembled components of the herein described electronic tube inside the evacuated envelope 24 (FIG. 1) is effected by support springs 29.

The herein described tube incorporates atomizable gas absorber, or getter 30.

Figure 4:
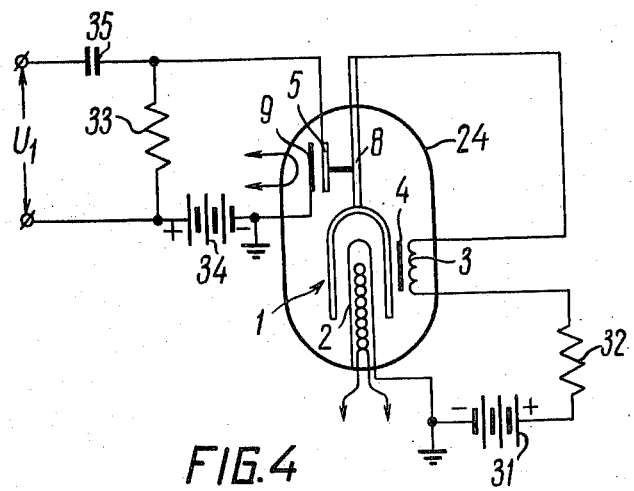
FIG. 4 is the circuit diagram of the pickup shown in FIG. 1.

The circuit diagram of the herein disclosed pickup for measuring the angular speed of a rotating object and the supply connections of the electrodes thereof are illustrated in FIG. 4.

The electronic-mechanical transducer acting as the device for exciting oscillation of the prongs of the fork 1 is associated with a source 31 of anode voltage supply. The "minus" terminal of the source 31 is connected to the indirectly heated oxide cathode 2, whereas the "plus" terminal thereof is connected to a resistor 32 acting as the anode load. Connected in series with the resistor 32 are the winding 3 about the core 4 and the fork 1 of which the prongs are the anode of this electronic-mechanical transducer. The electronic-mechanical transducer acting as the device for measuring the torsional oscillation of the fork 1 includes, as it has been already mentioned, the anode 5 fast with the prong 8 of the fork 1. The anode 5 is connected through a resistor 33 to a voltage source 34 of which the "minus" terminal is connected to the indirectly heated cathode 9. The voltage source 34 may be common to both abovedescribed electronic-mechanical transducers. The output electric signal $U_1$ of which the amplitude is proportional to the angular speed being measured is sent from across the resistor 33 through a dividing capacitor 35.

In order to increase the accuracy of the response of the herein disclosed pickup, the mechanically controlled electrode of the electronic-mechanical transducer acting as the device for measuring the torsional oscillation of the fork 1 (FIG.5), which electrode is the anode of this transducer, can be made up of two parts positioned symmetrically in respect of the prong 8 of the fork 1. One of these two parts is the anode 5, while the plate 11 is employed as the other anode. As it has been mentioned, in this case a cathode 36 similar to the indirectly heated cathode 9 and mounted in the same manner is positioned opposite the anode-plate 11. This electronic-mechanical transducer acting as the device for exciting oscillation of the prongs of the fork 1 in the herein described embodiment of the pickup is similar to the corresponding device in the abovedescribed embodiment, the power supply of its electrodes being effected in the same manner. This electronic-mechanical transducer comprises the anode voltage source 34 of which the "minus" terminal is connected to the two cathodes 9 and 36 through resistors 33 and 33', respectively, across which the output electric signal $U_2$ is derived.

Figure 5:
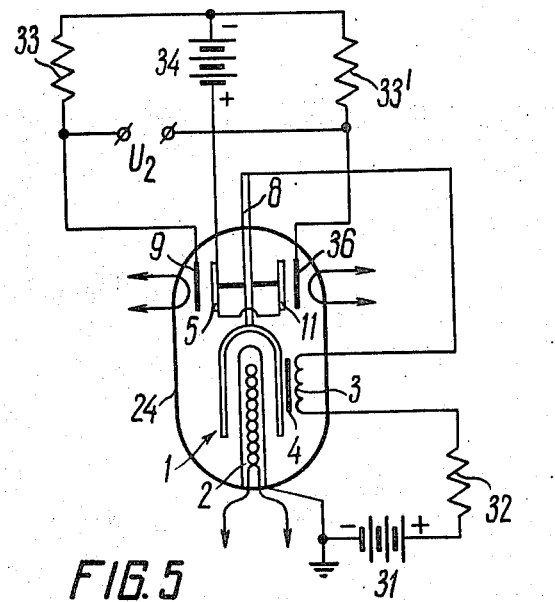
FIG. 5 is the circuit diagram of an alternative embodiment of the present invention, wherein the mechanically controlled electrode of the electronic-mechanical transducer acting as the device for measuring the torsional oscillation is in the form of two plates.
Figure 6:
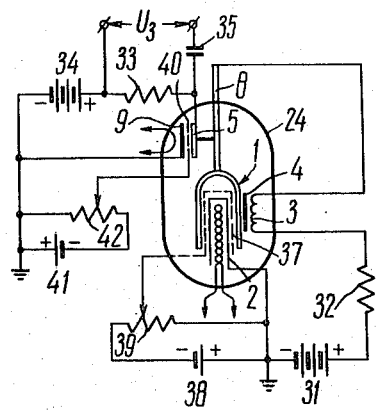
FIG. 6 is the circuit diagram of the third embodiment of the herein disclosed pickup, including two triode-type electronic-mechanical transducers.

The circuit diagram of a pickup constructed in accordance with yet another embodiment of the present invention, comprising two electronic-mechanical transducers acting, respectively, as the devices for exciting and measuring the torsional oscillation of the fork 1, each transducer including a triode with a mechanically controlled electrode — the anode, is illustrated in FIG. 6, the drawing also showing how the electrodes are supplied with electric power. The circuit diagram has much in common with that shown in FIG. 4, the difference being that in the presently described embodiment the electronic-mechanical transducer acting as the device for exciting oscillation of the prongs of the fork 1 (FIG. 5) includes a stationary grid 37 to which there is supplied an electric potential of 0.5 V to 10 V form a grid voltage supply source 38, the potential being adjustable by means of a variable resistor 39. The electronic-mechanical transducer acting as the device for measuring the torsional oscillation also includes a stationary grid 40 supplied with electric potential from a grid voltage source 41 through a variable resistor 42.

In still another embodiment of the present invention the mechanically controlled electrode of either one of the two abovespecified electronic-mechanical transducers acting, respectively, as the devices for exciting and measuring the oscillation of the prongs of the fork 1, is the grid of this transducer. When the mechanically controlled electrode of the electronic-mechanical transducer acting as the device for exciting oscillation of the prongs of the fork 1 is in the form of a grid 43 (FIG. 7), the latter is rigidly mounted on the prongs of the fork 1, The grid 43 in this case is made up from two parts secured to the respective prongs of the fork 1. The flat anode 44 of this electronic-mechanical transducer is likewise made from two parts mounted in front of the respective parts of the grid 43, parallel to the plane thereof.

In this last-described embodiment the structure of the electronic-mechanical transducer acting as the device for measuring the torsional oscillation of the fork 1 and the manner in which the electrodes of the two transducers are supplied with power are similar to those of the embodiment described hereinabove in connection with FIG. 6.

Figure 8:
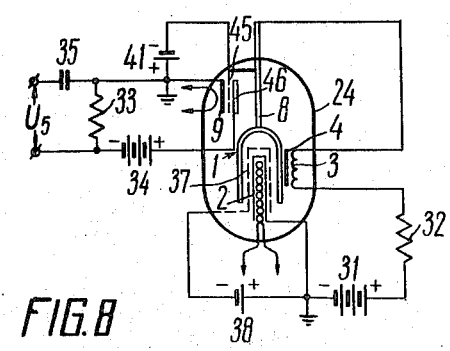
FIG. 8 is the circuit diagram of the fifth embodiment of the present invention, wherein the mechanically controlled electrode of the electronic-mechanical transducer acting as the device for measuring the torsional oscillation of the fork is in the form of a grid.

In the embodiment of the present invention illustrated in FIG. 8 the electronic-mechanical transducer acting as the device for measuring the torsional oscillation of the fork 1 has its mechanically controlled electrode in the form of a grid 45 rigidly secured to the stem 8 of the fork 1. In this case a flat anode 46 is mounted to extend parallel to the plane of the grid 45.

The power supply circuit of the electrodes of the pickup of this embodiment differs from the circuit previously described in connection with FIG. 6 in that here the grid 37 of the electronic-mechanical transducer acting as the device for exciting oscillation of the prongs of the fork 1 is supplied directly from a grid voltage supply source 38, while the grid 45 of the electronic-mechanical transducer acting as the device for measuring the torsional oscillation of the fork 1 is supplied with voltage from the grid voltage source 41.

The principle of operation of the herein disclosed pickup of the angular speed of a rotating object is, as follows.

When the voltage source 31 (FIG. 4) is turned on, any incidental deviation of the prongs of the fork 1 from the equilibrium state thereof varies the current flowing through the electronic-mechanical transducer including the indirectly heated cathode 2 and the prongs of the fork 1, and, consequently, the current flowing through the winding 3 about the core 4 also varies. With the current in the winding 3 varying, the prongs of the fork 1 are displaced still further, Finally, there is established a stationary oscillation mode at a natural frequency of the fork 1.

With the pickup not rotating, any torsional oscillation of the balanced fork 1 is absent, whereby the device for measuring the torsional oscillation develops no output signal. With the pickup rotating together with the fork 1, in accordance with the law of conservation of torque there is developed torsional oscillation of the fork 1 at the natural frequency thereof, the amplitude of the oscillation being proportional to the angular speed of the rotation.

The torsional oscillation make the anode 5 move alternatingly toward and away from the cathode 9, whereby, with the voltage supply source turned on, the current of the electronic-mechanical transducer acting as the device for measuring the torsional oscillation varies, and the voltage drop across the resistor 33 varies accordingly, the output signal $U_1$ being derived across this resistor 33 through the dividng capacitor 35.

The embodiment of the pickup for measuring the angular speed of a rotating object, illustrated in FIG. 5, operates in a similar manner, the only difference being that here the moment the anode 5 moves toward the cathode 9, the plate 11 acting as the second anode moves away from the cathode 36, and vice versa. Correspondingly, the variable components of the respective voltage drops across the resistors 33 and 33' are equal in value and opposite in phase. Consequently, here the value of the output signal $U_2$ is twice the value of the output signal $U_1$ (FIG. 4). Therefore, the sensitivity of the pickup of this embodiment is greater.

The embodiment of the herein disclosed pickup, illustrated in FIG. 6 and including electronic-mechanical transducers with the stationary grids 37 and 40, respectively, controlling the anode current of these two transducers operates, in general, similarly to the pickup illustrated in FIG. 4, the only difference being that here the amplitude of the voltage signal $U_3$ at the output of the pickup is greater, and there is attained better matching of the high-resistance winding 3 with the electronic-mechanical transducer acting as the device for exciting oscillation of the prongs of the fork 1.

The employment of the grid 43 (FIG. 7) as the mechanically controlled electrode of the electronic-mechanical transducer acting as the device for exciting oscillation of the prongs of the fork 1 facilitates excitation of the oscillation of these prongs of the fork 1. In every other respect the operation of the pickup illustrated in FIG. 7 is similar to that of the pickup shown in FIG. 6.

The operation of the pickup illustrated in FIG. 8 is also similar to the operation of the embodiment of the present invention shown in FIG. 6. Here the employment of the grid 45 as the mechanically controlled electrode of the electronic-mechanical transducer acting as the device for measuring the torsional oscillation of the fork 1 provides for increasing considerably the voltage sensitivity of the pickup.

Figure 7:
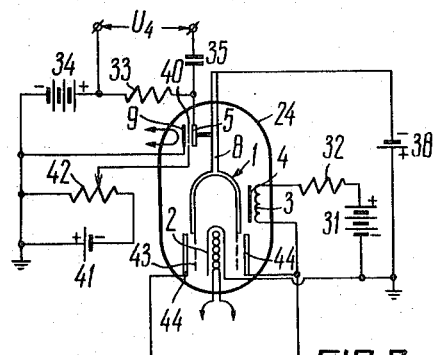
FIG. 7 is the circuit diagram of the fourth embodiment of the herein disclosed pickup, wherein the mechanically controlled electrode of the electronic-mechanical transducer acting as the device for exciting oscillation of the prongs of the fork is in the form of a grid.

The voltage drops $U_4$ and $U_5$ correspond, respectively, to the output signals of the pickups illustrated in FIGS. 7 and 8.

The herein disclosed pickup displays high sensitivity, as far as the variable measured thereby is concerned, together with an increased accuracy of the response; it is of a simple structure; the supply circuit of its electrodes is both simple and economical. Moreover, the pickup offers a relatively high amplitude of the output signal.

What is claimed is:

1. A pickup of the angular speed of a rotating object, comprising: a housing, a fork received in said housing, the prongs of said fork; the stem of said fork; a device for exciting oscillation of said prongs of said fork, disposed within said housing; a device for measuring the torsional oscillation of said fork, developed upon said pickup together with the associated object being rotated about the axis of symmetry of said fork, said last-mentioned device being disposed adjacent to said stem of said fork; at least one of said device being in the form of an electronic-mechanical transducer including a mechanically controlled electrode, said device for exciting the oscillation of said prongs of said fork being in the form of said electronic-mechanical transducer of which said mechanically controlled electrode is formed by said prongs of said fork, said prongs being the anode of said transducer, there being disposed adjacent to said prongs at least one winding about a core adapted to excite oscillation of said prongs of said fork and connected to said anode of the transducer, the cathode of the said transducer being disposed intermediate of said prongs of said fork.

2. A pickup according to claim 1 wherein said device for measuring the torsional oscillation of said fork is in the form of said electronic-mechanical transducer of which said mechanically controlled electrode is formed by at least one plate rigidly mounted on said stem of said fork, said plate acting as the anode of said transducer and being displaceable in respect of the cathode of said transducer upon development of the torsional oscillation of said fork, thereby varying periodically the anode current at the natural frequency of oscillation of said fork with the amplitude of the variable component of said current proportional to the angular speed of said rotating object, the working surface of said cathode extending parallel with the plane of said anode.

3. A pickup according to claim 2, wherein said device for exciting oscillation of said prongs of said fork is the form of an electronic-mechanical transducer of which the mechanically controlled electrode is a grid mechanically connected with said prongs of said fork, the anode and the cathode of said transducer being positioned, respectively, to the opposite sides of said grid and parallel therewith, there being positioned directly adjacent to said prongs of said fork at least one winding about a core, adapted to excite oscillation of said prongs of said fork and connected to said anode of said transducer.

4. A pickup according to claim 1, wherein said device for measuring the torsional oscillation of said fork is in the form of an electronic-mechanical transducer of which the mechanically controlled electrode is formed by at least one plate rigidly mounted on said stem of said fork, said plate acting as the anode of said transducer and being displaceable in respect of the cathode of said transducer upon development of the torsional oscillation of said fork, thereby varying periodically the anode current at the natural frequency of oscillation of said fork with the amplitude of the variable component of said current proportional to the angular speed of said rotating object, the working surface of said cathode extending parallel with the plane of said anode.

5. A pickup according to claim 1, wherein said device for exciting oscillation of said prongs of said fork is in the form of said electronic-mechanical transducer of which said mechanically controlled electrode is a grid mechanically connected with said prongs of said fork, the anode and the cathode of said transducer being positioned, respectively, to the opposite sides of said grid and parallel therewith, there being positioned directly adjacent to said prongs of said fork at least one winding about a core, adapted to excite oscillation of said prongs of said fork and connected to said anode of said transducer.

6. A pickup according to claim 5, wherein said device for measuring the torsional oscillation of said fork is in the form of an electronic-mechanical transducer of which the mechanically controlled electrode is a grid mechanically connected with said stem of said fork and displaceable in respect of the cathode and anode of said transducer upon development of the torsional oscillation of said fork, which brings about periodic variation of the anode current at the natural frequency of oscillation of said fork with the amplitude of the variable component of said current proportional to the angular speed of said rotating object, the respective working surfaces of said cathode and said anode being parallel with the plane of said grid.

7. A pickup according to claim 1 wherein said device for measuring the torsional oscillation of said fork is in the form of an electronic-mechanical transducer of which the mechanically controlled electrode is a grid mechanically connected with said stem of said fork and displaceable in respect of the cathode and anode of said transducer upon development of the torsional oscillation of said fork, which brings about periodic variation of the anode current at the natural frequency of oscillation of said fork with the amplitude of the variable component of said current proportional to the angular speed of said rotating object, the respective working surfaces of said cathode and said anode being parallel with the plane of said grid.

* * * * *